W. G. SCHAEFFER.
MOTOR CYCLE DRIVE MECHANISM.
APPLICATION FILED DEC. 6, 1907.

965,950.

Patented Aug. 2, 1910.

Witnesses

Wm. G. Schaeffer  Inventor

By

Attorney

UNITED STATES PATENT OFFICE.

WILLIAM G. SCHAEFFER, OF READING, PENNSYLVANIA, ASSIGNOR TO READING STANDARD COMPANY, OF READING, PENNSYLVANIA, A CORPORATION OF PENNSYLVANIA.

MOTOR-CYCLE DRIVE MECHANISM.

965,950.   Specification of Letters Patent.   Patented Aug. 2, 1910.

Application filed December 6, 1907. Serial No. 405,346.

*To all whom it may concern:*

Be it known that I, WILLIAM G. SCHAEFFER, a citizen of the United States, and a resident of the city of Reading, in the county of Berks and State of Pennsylvania, have invented certain new and useful Improvements in Motor-Cycle Drive Mechanism, of which the following is a specification.

My invention relates particularly to drive gear mechanism for motor-cycles and it consists in providing in connection with the usual pedal-shaft mounting in the cycle frame, a sprocket-wheel counter-shaft for the motor drive which is mounted in the motor crank-casing, as fully described in connection with the accompanying drawings and specifically pointed out in the claims.

Figure 1:
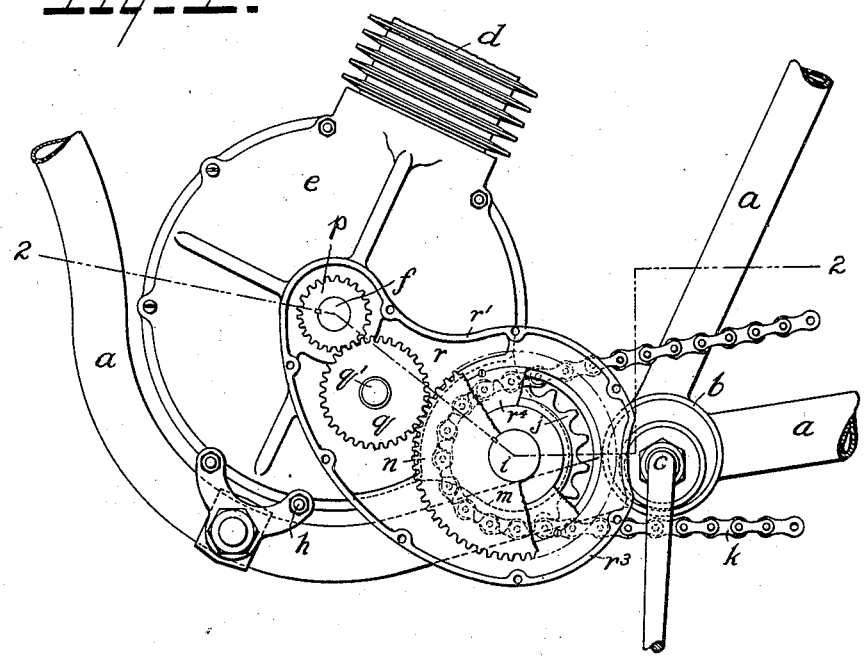
Figure 2:
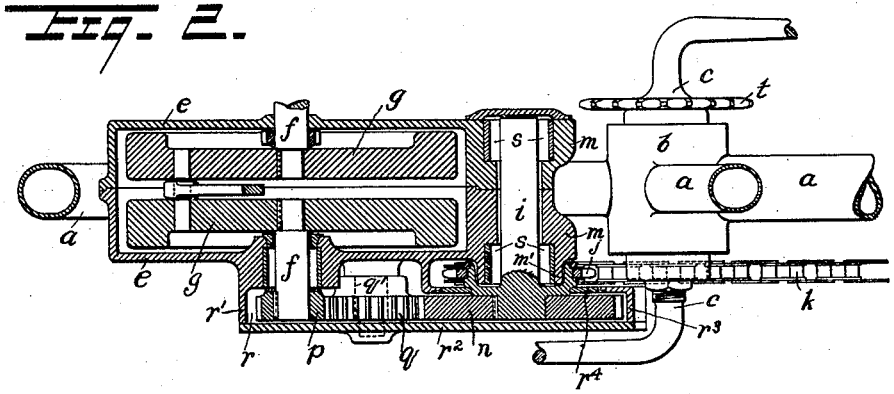

Figure 1 is a partial side elevation of a motor cycle having my invention applied thereto in preferred form; the cover-plate of the drive-gear chamber being removed, and a portion of the countershaft gear-wheel broken away to show the sprocket wheel on the inner side of said chamber. Fig. 2 is a cross-sectional plan view on the line 2—2 of Fig. 1.

$a$ $a$ represent a portion of a cycle frame which is provided with a pedal-shaft hanger or bearing $b$ for the pedal shaft $c$; said pedal shaft being provided as usual with a sprocket wheel $t$ for the pedal drive chain and being shown eccentrically mounted to provide for adjustment of said chain.

$d$ represents a portion of an ordinary motor, and $e$ $e$ the usual crank casing inclosing the motor shaft $f$ and fly wheel $g$; said casing being rigidly secured to the cycle frame $a$ in any preferred manner, as indicated at $h$. As shown the motor is located forward of the pedal shaft $c$, and the motor drive is effected through a countershaft $i$ provided with a sprocket $j$ having a drive chain $k$ extending to the rear wheel of the cycle astride the pedal shaft bearing $b$.

In my improved construction the motor countershaft $i$ is mounted independently of the cycle frame in a bearing $m$ formed at the periphery of the motor crank casing $e$. The countershaft is provided at its outer end with a gear wheel $n$ which is driven by a pinion $p$ on the motor shaft, through an idler wheel $q$, and these gears $p$, $q$, $n$, are inclosed in a drive-gear chamber $r$ formed on the outer face of the crank-casing $e$. This chamber is formed by an outwardly projecting flange $r'$ on the casing, adapted to receive a cover plate $r^2$, and it extends at $r^3$ beyond the periphery of the casing $e$, in front of the casing bearing $m$, to inclose the gear $n$, said extension $r^3$ as shown being provided with a removable inner-wall section $r^4$ for a purpose hereafter described. The idler gear $q$ is mounted upon a stud bearing $q'$ projecting from the face of the casing $e$ within the chamber $r$ as indicated. The countershaft bearing lug $m$ $m$ as shown is formed with annular roller bearing pockets $s$ $s$ for the countershaft $i$, and the latter is formed with a cupped collar to which the sprocket wheel $j$ is fixed and which shoulders against the gear wheel $n$ and encircles the end portion $m'$ of the casing bearing lug $m$. The removable inner-wall section $r^4$ of the drive gear casing enables this countershaft, with the sprocket wheel $j$ fixed thereto, to be readily placed in position in the casing bearing $m$ $m$ as shown; the wall-section $r^4$ being thereafter secured in place, the gear wheel $n$ fixed to the projecting end of the countershaft within the extended chamber $r$, and the cover plate $r^2$ finally put on to form a closed gear chamber which may be partially filled with oil to insure satisfactory lubrication of the parts.

What I claim is:—

1. In a motor cycle a motor crank-casing secured to the cycle frame and provided with a peripheral lug forming a countershaft bearing, and with a drive-gear chamber on the outer face of the casing, said chamber extending beyond the periphery of the casing and being provided with a removable inner wall section concentric with said casing bearing, and a countershaft mounted in said casing bearing and provided with an inner sprocket wheel located adjacent said removable wall and with a gear wheel located within said chamber, said countershaft gear wheel being in gear with the motor shaft, substantially as set forth.

2. In a motor cycle provided with a pedal-shaft bearing, a motor crank-casing secured to the cycle frame forward of said pedal shaft bearing and having an integrally formed peripheral countershaft bearing located adjacent said pedal shaft bearing, a countershaft mounted in said casing bearing and provided with an outer gear wheel arranged in gear with the motor shaft and with an inner sprocket wheel, a drive chain on said sprocket wheel running astride the pedal-shaft bearing, and a drive-gear chamber formed on said casing and extending rearward so as to overlap the pedal shaft bearing substantially as set forth.

In testimony whereof, I affix my signature, in the presence of two witnesses.

WM. G. SCHAEFFER.

Witnesses:
D. M. STEWART,
W. G. STEWART.